(12) United States Patent
Dorling

(10) Patent No.: US 6,747,796 B1
(45) Date of Patent: Jun. 8, 2004

(54) HIGH CONTRAST SCREEN MATERIAL

(76) Inventor: Michael G. L. Dorling, 20 Richmond Court, Ashton Keynes, Swindon (GB)

(*) Notice: Subject to any disclaimer, the term of this patent is extended or adjusted under 35 U.S.C. 154(b) by 0 days.

(21) Appl. No.: 10/030,750
(22) PCT Filed: May 10, 2000
(86) PCT No.: PCT/GB00/01773
§ 371 (c)(1),
(2), (4) Date: Nov. 9, 2001
(87) PCT Pub. No.: WO00/68712
PCT Pub. Date: Nov. 16, 2000

(30) Foreign Application Priority Data

May 11, 1999 (GB) .............................................. 9910941

(51) Int. Cl.[7] .............................................. G03B 21/60
(52) U.S. Cl. ........................................ 359/452; 359/453
(58) Field of Search ............................... 359/443, 452, 359/453

(56) References Cited

U.S. PATENT DOCUMENTS

| | | | |
|---|---|---|---|
| 2,287,556 A | | 6/1942 | Land |
| 3,552,822 A | * | 1/1971 | Altman ....................... 359/453 |
| 3,609,000 A | * | 9/1971 | Miyano et al. .............. 359/453 |
| 3,679,451 A | * | 7/1972 | Marks et al. ................ 359/453 |
| 4,983,016 A | | 1/1991 | Yamamoto |
| 5,815,313 A | * | 9/1998 | Mitani et al. ................ 359/452 |
| 6,204,971 B1 | * | 3/2001 | Morris et al. ................ 359/453 |
| 6,261,402 B1 | * | 7/2001 | Watanabe et al. ........... 359/453 |
| 6,327,091 B1 | * | 12/2001 | Agano ........................ 359/452 |
| 6,346,311 B1 | * | 2/2002 | Yeo et al. ................... 359/452 |
| 6,466,368 B1 | * | 10/2002 | Piepel et al. ................ 359/452 |

FOREIGN PATENT DOCUMENTS

| | | | | |
|---|---|---|---|---|
| EP | 0 464 499 A2 | | 1/1992 | |
| EP | 0 843 203 A1 | | 5/1998 | |
| EP | 843203 A1 | * | 5/1998 | ........... G03B/21/60 |
| GB | 401700 | * | 11/1933 | |
| JP | 05-113606 A | | 5/1993 | |
| JP | 07077681 A | * | 3/1995 | ............. G02F/1/13 |

* cited by examiner

Primary Examiner—Christopher Mahoney
(74) Attorney, Agent, or Firm—Webb Ziesenheim Logsdon Orkin & Hanson, P.C.

(57) ABSTRACT

A high contrast projection or depixelating screen comprises a primary matrix of a first transparent material, bodies of a second transparent material of a different refractive index from the first material and, additionally, light absorbing or filtering bodies. In variants, the matrix is a light filtering material and incorporates discrete bodies of light transmitting material.

4 Claims, 1 Drawing Sheet

HIGH CONTRAST SCREEN MATERIAL

BACKGROUND OF THE INVENTION

1. Field of the Invention

This invention relates to a light (diffusing, optical screen material such as may be used, for example, as a rear or front projection screen or as a depixelating screen for reducing the perception of individual pixels in a pixelated (e.g. LCD) display or, analogously, of tile individual scan lines of a CRT display.

2. Description of the Prior Art

The formulation and processing of polymer materials to create diffusers suitable as optical screen materials have been described in U.S. Pat. No. 2,287,556 (Land), U.S. Pat. No. 4,983,016 (Yamamoto), EP-A-0464499 (Sumitomo) and EP-A-0843203 (Nashua). These specifications describe symmetrically and asymmetrically diffusing optical screen materials which may be created by extrusion or casting. Asymmetry in diffusion is imparted typically by stretching to create orientation. However all the above materials appear "white" to a greater or lesser extent in ambient lighting conditions, that is without illumination from an imaging system. The whiteness is a function of light scattering by the dispersed particles incorporated in the materials to render them light-diffusing. As a result of this whiteness, an image created optically in the diffusing material suffers from a lack of contrast. Contrast may be recovered or improved for example, by the addition of a polarising film as described in the Sumitomo Japanese laid open Application Ser. No. 5-113606 or by the use of a second layer of a tinted acrylic material. Although both these approaches can improve contrast, this is achieved with a significant loss in brightness (gain), (as much as 50% where a polarising film is used).

It is an object of the present invention to provide a diffusing material providing improved contrast without a significant reduction in brightness.

SUMMARY OF THE INVENTION

According to one aspect of the invention there is provided a high contrast projection, depixelating, or the like screen, comprising a primary matrix of a first, transparent material, a first quantity of discrete bodies of a second transparent material of a refractive index different from the primary matrix material distributed in said primary matrix and a second quantity of discrete light absorbing or filtering bodies distributed in said primary matrix.

According to another aspect of the invention, there is provided a method of forming a screen according to the first-mentioned aspect, comprising compounding, in a molten or plastic state, a first light-transmitting thermoplastics matrix material with a second light-transmitting thermoplastics material insoluble in, and having a different refractive index from the first, and with a third thermoplastics material insoluble in the first, said third material being light-absorbing or attenuating, the method further comprising extruding the resulting compound through a slot Preferably, particularly where a high density of the discrete bodies in the primary matrix is contemplated, the second and third plastics materials are also mutually incompatible (i.e. mutually insoluble).

According to yet another aspect of the invention there is provided a high contrast projection, depixelating, or the like screen, comprising discrete bodies of a first material and refractive index in a matrix of a second material and refractive index, one said material being transparent and the other being light-filtering.

According to still another aspect of the invention there is provided A method of forming a screen, comprising forming a mixture comprising a plurality of discrete light-transmitting bodies in a fluid, light-filtering matrix or binder, forming the resulting mixture into a thin layer or sheet, and causing or allowing at least said binder to set.

BRIEF DESCRIPTION OF THE DRAWINGS

Embodiments of the invention are described below by reference to the accompanying drawings, in which.

DETAILED DESCRIPTION OF THE INVENTION

Figure 1:
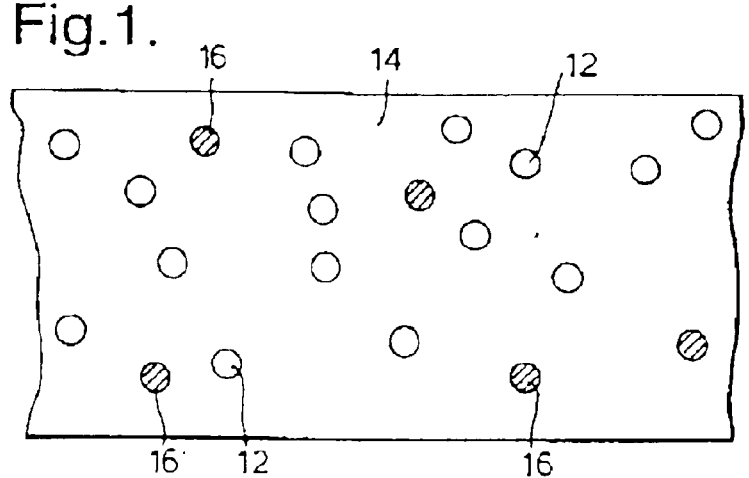
FIG. 1 is a schematic view, in cross section perpendicular to the plane of the sheet material, through a first form of light diffusing sheet material embodying the invention.

Referring to FIG. 1, a high-contrast light-diffusing material embodying the invention comprises a transparent primary matrix 14 incorporating a first quantity of discrete transparent bodies 12 embedded in the matrix 14 and of a different, for example higher refractive index than the matrix 14, (these bodies being represented in FIG. 1 as unshaded circles), and a second quantity of discrete light filtering or attenuating bodies 16 (represented in FIG. 1 by shaded circles), the bodies 12 and 16 being fully interspersed and distributed evenly but at random throughout the primary matrix 14. Each body 16 preferably comprises a transparent matrix, (preferably of a different (e.g. higher) refractive index than the primary matrix) within which is distributed discrete light absorbing particles, such as particles of carbon-black. Alternatively, each body 16 may comprise a transparent material incorporating a light filtering dye, such as a neutral (as regards colour—i.e. grey) dye. In preferred embodiments of the invention, the primary matrix material 14 and the bodies 12 and 16 are of plastics materials, preferably thermoplastics, the matrix 14 defining a plastics sheet or film of a thickness of, typically 0.12 mm, with the mean diameter of the bodies 12, 16, being for example, of the order of 5 to 10 microns ($m^{-6}$). In the preferred embodiment, the ratio, by volume, of the fist bodies 12 to the primary matrix 14 is 15:85 whilst the ratio, by volume, of the second bodies 16 to the primary matrix is of the order of 2:100. The percentage, by volume of pigment (carbon black) in the bodies 16 in the preferred embodiment is about 2.5%, so that the pigment makes up around 0.05% by volume of the screen as a whole.

It will be appreciated that the bodies 16 are, at 5 microns to 10 microns diameter, significantly larger than (and additionally much more regular in shape than (being generally spheroidal or ellipsoidal)), tic particles of filler or pigment, (such as carbon black or silica) conventionally incorporated in plastics material. (The same also applies, of course, to the bodies 12). It is contemplated that the light-transmitting or absorbing, respectively, particles 12 or 16 need not be of thermoplastics, but may be of other materials such as thermosetting resin, or glass (clear or pigmented) for example.

It will be appreciated that the structure described with reference to FIG. 1 may be achieved in several ways. For example, pre-formed solid bodies 12, 16 of the desired size may be mixed with a molten thermoplastics polymer which is subsequently extruded, or extruded and blown, to form the sheet screen material, or respective quantities of incompatible thermoplastics materials may be compounded in a plasticised or molten state to break up the (molten) materials forming the minor proportions of the blend into discrete globules of the desired size, suspended in a continuous matrix formed by the molten major component and the resulting material may be formed into a sheet or film by any of a variety of methods known per se.

In the preferred embodiments, in which the bodies 12 and 14 are formed from thermoplastics incompatible with the thermoplastics matrix material 14 and the compounded mixture, in a molten or plasticised state is formed into a thin film by a process in which a smaller diameter tube formed by extrusion is inflated under internal pressure and whilst still in plastically deformable state to a larger tube and the inflated tube is drawn off (hauled off) mechanically (and, for example, rolled up) all by a process similar to that conventionally used in the manufacture of plastic bags, the extrusion and hauling-off tend to stretch the matrix 14 and the bodies 12, 16 in the direction of longitudinal extrusion, whilst the blowing tends also to stretch the matrix 14 and the bodies 12, 16 circumferentially in the circumferential direction of the tube. Preferential elongation of the bodies 12, 16 in one direction in the "plane" of the sheet material renders the light diffusing properties of the material asymmetric, that is to say the material diffuses light through a narrower angle in a plane perpendicular to the sheet material and parallel with direction of elongation than in a plane perpendicular to the sheet material and to the direction of elongation. By controlling the draw-off rate relative to the extrusion and inflation rates, this asymmetry can be controlled or neutralised to produce a light diffusing material having a controlled degree of, or no, diffusive asymmetry. Since, with the production method described, a screen material having no diffusive asymmetry is one in which each body 12, 16 has, in principle, been stretched equally in all directions in the plane of the sheet, it will be appreciated that in such a material the shapes of the bodies may range from oblate spheroids to circular lenticular or disc-like bodies.

Examples of manufacture of optically diffusing screens by the technique described above are described in more detail below:

EXAMPLES

In the following examples, an extrudable thermoplastics compound was produced by mixing the component polymers in a compounding extruder fitted with a cavity transfer mixer. The compound was then extruded into a thin film using a conventional extrusion line incorporating film blowing equipment. The process temperature was 180° C. The extrusion die had a diameter of 180 mm with a (radial) die gap of 1.2 mm and the extruded material was blown to a diameter of either 400 mm or 490 mm enabling the production of two continuous films (by flattening the blown tube and slitting or trimming along opposite longitudinal edges of the flattened tube), of a width of approximately 24 inches (600 mm) or 30 inches (720 mm) respectively. The results provided for Examples 1 and 2 were taken from 30 inch width film, that is a bubble diameter of about 480 mm. In the process, the bubble is collapsed to provide two films each representing half the circumference of the bubble. The reduction in thickness of 10:1 comes from the ratio of bubble to die diameter (about 3:1) and haul-off rate. Bubble ratios in excess of 5:1 can be achieved. The intention, in the examples herein, was to produce a light-diffusing material with a high angle of view and approximately symmetric light-diffusing properties, i.e. diffusion of light substantially equally in all directions. The haul-off rate controls the symmetry or degree of asymmetry in diffusion (for a given bubble ratio) whereas the extrusion rate that is, the rate at which the extruder pumps material controls the angle of view (mainly by controlling the product thickness). For symmetric materials the haul-off rate and the extrusion rate should be very similar for the exemplified approx. 10:1 thickness reduction.

Example 1

This example was intended as a comparison or "control" against which the performance of a screen material embodying the invention could be fairly assessed. Extrudable plastics material was compounded, blending ethylene/ethyl acrylate copolymer resin, LE 5861 (available from Borealis/Distrupol) with polystyrene resin, N1910, (available from Victor Plastics) in the ratio 85:15, and the resulting material extruded through an annular die and blown as described above. The finished film thickness after extrusion and blowing was 124 $\mu$m, Samples of this film were laminated to a polarising film, Polaroid type KE and separately to a tinted acrylic sheet, the neutral density of which was 0.3 and to a similar acrylic sheet with a neutral density of 0.2. As the ethylene/ethyl acrylatc copolymer resin and the polystyrene resin are incompatible (i.e. each is substantially insoluble in the other), the compounding process resulted in a quasi emulsion or dispersion of minute droplets of molten polystyrene resin in the molten acrylatc copolymer resin. Because of the difference in refractive index of the two resins, the film produced was light-diffusing.

Example 2

In this example in accordance with the present invention, the compounding and extrusion process as described in Example 1 was repeated except that the compound comprised, in addition to ethylene/ethyl acrylate resin and clear polystyrene resin in the same proportions as in Example 1, 2% of pigmented polystyrene resin, type Lacqrene 163. The finished film thickness was 125 $\mu$m. (Polystyrene Lacqrene 163 black 1002 is available from Elf Atochem and contains less than 3% carbon black).

The materials produced in accordance with Examples 1 and 2 were compared in respect of angle of view, gain and contrast. The results are summarised in Table 1 as follows:

TABLE 1

|  | Angle of View | Gain | Contrast |
| --- | --- | --- | --- |
| Material of Example 1 (unlaminated) | 70 × 65 | 1.74 | — |
| Material with polarised layer | 71 × 64 | 0.86 | 0.33 |
| Material with tinted acrylic layer (neutral density 0.3) | 65 × 57 | 0.94 | 0.3 |
| Material with tinted acrylic layer (neutral density 0.2) | 65 × 57 | 1.18 | 0.2 |
| Material of Example 2 | 66 × 60 | 1.56 | 0.2 |

(The two figures in each entry in the Angle of View column in Table 1 denote the angle of view in two orthogonal planes, the material being in each case asymmetrically diffusing. It will be understood that the polarised layer and tinted acrylic layer referred to were laminated to the respective samples of the material of Example 1 in order to approximate to the contrast-enhaneing effect of the pigmented bodies in the material of Example 2).

Although the gain measurement for the material of Example 2 is slightly reduced, as compared with the unlaminated material of Example 1, it is substantially greater than for the other material of improved contrast illustrated in the table (and in which the improved contrast is achieved by lamination with either a tinted acrylic layer or a polariser layer).

Whist, for the purposes of the measurements illustrated in the above table, the material of Example 2 was not laminated to any other material, it will be understood that, in any particular application, that extended, blown material may be laminated to a transparent or reflective substrate or superstrate.

The materials described may also be used with advantage in other areas where optically diffusive screens are utilised, for example, as layers to be incorporated on or in LCD displays, particularly pixelated LCD graphic displays, for example to reduce the susceptibility of the individual pixels.

Figure 2:
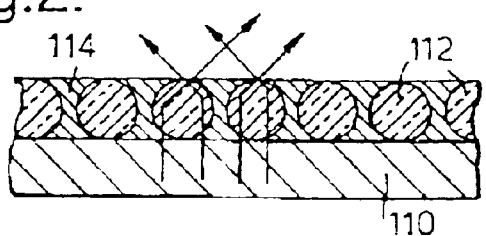
FIG. 2 is a schematic view, in cross section perpendicular to the plane of the sheet material, through another form of light diffusing sheet material embodying the invention.

Referring to FIG. 2, a high-contrast light-diffusing material embodying the invention, according to another aspect, comprises, arranged on a supporting substrate 110, a light-diffusing layer comprising discrete transparent bodies 112 embedded in a matrix 114 of a lower refractive index comprising a light-filtering material preferably with neutral filtering characteristics (i.e. attenuating all wavelengths of colour substantially equally so as not to impart any colour "tinting").

In the arrangement shown, the transparent bodies 112 are in the form of spheres of substantially the same diameter as one another and the thickness of the matrix 114 corresponds substantially to the diameter of said spheres, so that the spheres lie in a mono-layer resting on the upper surface of the substrate 110 and are just exposed at the free surface of the matrix layer 114.

Where the layer 112 is transparent, a parallel beam of light directed normally onto the rear (lower) surface of the layer 10 will pass therethrough and the portions of the beam aligned with the transparent spheres 112 will be refracted thereby, (because the matrix 114 is of a lower refractive index than the spheres 112) to exit from the layer 112, 114 over a range of different directions, i.e. to be diffused. Each sphere 112 thus acts as a tiny convex lens. It will be understood that, where each sphere extends precisely for the whole depth of the matrix layer 114 and no further, any ray of light, perpendicular to the plane of the screen, passing through such a sphere 112 other than precisely along its vertical axis, will also have to pass through a certain amount of the matrix material 114 before reaching the sphere 112 and after leaving the latter and before exiting from the diffusive layer and thus will be, to some extent, attenuated by the matrix material 114. Clearly if the matrix material 114 were entirely opaque, with the arrangement illustrated in FIG. 2, substantially no light could pass through the product. However, by judicious selection of the darkness of the filter 114, it can be ensured that, for each sphere 112, the attenuation of light for light entering the layer 112, 114, normally, (i.e. perpendicularly) within a radial distance from the central axis of the sphere which is only slightly less than the radius of the sphere itself, is significantly lower than for light passing normally through the matrix material 114 without passing through any sphere 112. Accordingly, light passing through the spheres 112 and thus subjected to the "scattering" or "diffusing" effect of the spheres, is very little attenuated whilst light passing through the matrix material between adjacent spheres, is severely, preferably almost entirely, attenuated. It will be appreciated that, where the material is used as a rear projection screen, for example, light which passes through the matrix material without deviation will contribute nothing to image forming for any observer not viewing the screen along a line precisely perpendicular to tote latter. More importantly, however, the dark nature of the matrix significantly reduces, in such a scenario, the amount of ambient light, (and thus light without image content), which may be reflected towards an observer, and thus minimises the loss of visual contrast experienced by an observer in high ambient light conditions.

Figure 3:
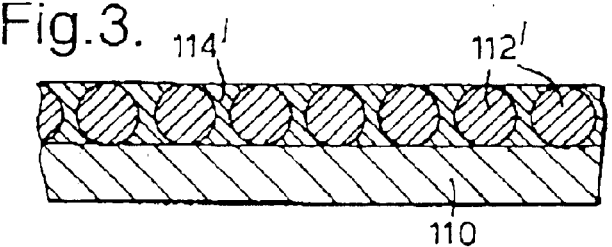
FIG. 3 is a view similar to FIG. 2, illustrating a further embodiment.

Conversely, FIG. 3 illustrates an arrangement which corresponds substantially with that of FIG. 2 except that in the arrangement of FIG. 3 it is the spheres 112' which are opaque and the matrix material 114' which is transparent. In this case, the transparent matrix material 114' preferably has a refractive index higher than that of the spheres 112' so that light passing through the substrate 110 and entering the regions between adjacent opaque spheres 112' will either be totally reflected at the boundaries between the spheres 112' and the matrix 114' or will tend, at any rate, to be refracted to pass only through minor portions of the spheres 112' and re-enter the transparent region, again enhancing the proportion of the image-forming light scattered by the transparent regions as compared with light reflected from the other regions. In either case (FIG. 2 or FIG. 3) the effect is to enhance the screen contrast, as compared with a plain light-scattering Lambertian front or rear projection screen, thereby enhancing contrast in high ambient light conditions.

It will be appreciated that, in practice, the desired effect may be achieved, at least to a major extent, even if the heights of the bodies 112, 112' relative to the upper surface of the substrate 110 do not correspond exactly to the depth of the matrix 114, 114'. Indeed, with the arrangement described with reference to FIG. 2, the contrast afforded by the material may be significantly improved if the matrix 114 is of a depth somewhat less than the heights of the bodies 112, perhaps even only half the heights of the spherical bodies 112. It will also be appreciated that the bodies 112 need not be spherical but may be of some other shape.

Figure 4:
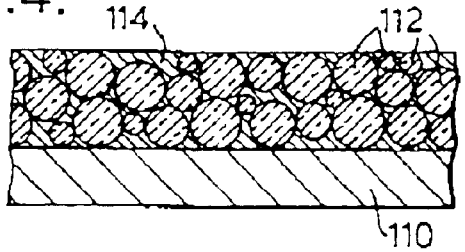
FIG. 4 is a view similar to FIGS. 2 and 3, illustrating a still further embodiment

Furthermore, it will also be appreciated that the desired contrast enhancing effect may be achieved even if the matrix 114, 114' is of a somewhat greater depth than the bodies 112, 112' and, indeed, may be achieved where the bodies 112 are not arranged strictly in a mono-layer but in a layer of several bodies deep, as illustrated in FIG. 4.

As with the embodiment of FIG. 1, the structure described with reference to FIGS. 2 to 4 may be achieved in several ways. Thus, for example, pre-formed solid bodies 112 of transparent material may be mixed with a tinted or dyed molten thermoplastics polymer which is spread on the substrate 110 in a thin layer in a molten state and allowed to harden or solidify to form the material of FIG. 2 or, alternatively, tinted or opaque spheres 112' may be mixed with a molten and transparent thermoplastics polymer which is likewise spread in a thin layer on the substrate 110 and allowed to harden or solidify, to form the material of FIG. 3. Alternatively, of course, the initially fluid matrix material may be a monomer or other polymer precursor which is spread in a fluid state onto the matrix 110 and thereafter irradiated or otherwise caused to polymerise or set In further variants of the method, mutually incompatible liquids, one being dyed or tinted, may be mixed together so that small bodies or droplets of the one are dispersed within the other to form an emulsion or quasi-emulsion which is spread onto the substrate after which the materials are allowed or caused to harden, at least the matrix material is caused or allowed to harden.

Thus, a minor proportion of a polymer containing pigment or dye may be dispersed within the bulk of a transparent polymer material incompatible with the pigmented or dyed polymer, such that the pigment or dye remains within the first-mentioned polymer and is not dispersed in the bulk of the transparent material. As a result, when the resulting product is used as a projection screen, contrast is enhanced and gain substantially unaffected.

Whilst, in the above description with reference to FIGS. 2 to 4, it has been assumed that the substrate 110 is transparent, it will be appreciated that the substrate 110 may be made reflective, for example, by being formed as a layer of reflective metal foil, where the material is to be used as the front projection screen. Furthermore, of course, the substrate 110 may be dispensed with altogether.

If desired, the material described with reference to FIG. 1 may also be made so thin that the bodies 12, 16, have diameters of the same order as the thickness of the screen, so that the bodies 12, 16 effectively form a mono-layer. As with the embodiment of FIG. 1, die screen of any of FIGS. 2 to 4 may be made by a process in which a blend of incompatible thermoplastic polymers is formed into a thin film by forming a smaller diameter tube by extrusion and inflating the tube under internal pressure and whilst still in plastically deformable state to a much larger tube, by a process similar to that conventionally used in the manufacture of plastic bags.

What is claimed is:

1. A high contrast projection, depixelating or the like screen comprising a primary matrix of a first, transparent material, a first quantity of discrete bodies of a second transparent material of a refractive index different from the primary matrix material distributed in said primary matrix and a second quantity of discrete light absorbing or filtering bodies distributed in said primary matrix;

wherein the bodies of said second quantity each comprise a matrix of a transparent material incorporating light absorbing or opaque particles; and wherein the transparent material or matrix material of said second quantity of discrete bodies has a different refractive index than from said primary matrix.

2. The screen according to claim 1 wherein the bodies of said second quantity each comprise a transparent material incorporating a light filtering dye.

3. A high contrast projection, depixelating or the like screen comprising a primary matrix of a first, transparent material, a first quantity of discrete bodies of a second transparent material of a refractive index different from the primary matrix material distributed in said primary matrix and a second quantity of discrete light absorbing or filtering bodies distributed in said primary matrix;

wherein the bodies of said second quantity each comprise a matrix of a transparent material incorporating light absorbing or opaque particles;

wherein the transparent material or matrix material of said second quantity of discrete bodies has a different refractive index than from said primary matrix; and wherein the materials of said first and second quantity have higher refractive indices than said primary matrix.

4. The screen according to claim 3 wherein the bodies of said second quantity each comprise a transparent material incorporating a light filtering dye.

* * * * *